United States Patent Office 3,464,897
Patented Sept. 2, 1969

3,464,897
SEPARATION OF PROPYLENE OXIDE FROM OTHER HYDROCARBONS
John C. Jubin, Jr., Wallingford, Pa., assignor to Atlantic Richfield Company, Philadelphia, Pa., a corporation of Pennsylvania
No Drawing. Filed June 2, 1967, Ser. No. 643,063
Int. Cl. B01d 3/34
U.S. Cl. 203—52         7 Claims

ABSTRACT OF THE DISCLOSURE

This invention relates to an improvement in the separation of propylene oxide from other hydrocarbon compounds which upon distillation exhibit boiling points equal to or near that of propylene oxide. The improvement comprises distilling the mixture in the presence of an open chain or cyclic paraffin containing from 8 to 12 carbon atoms. The amount of paraffin normally ranges from about 0.1 to 20 parts by weight per one part propylene oxide.

Background of invention

In the epoxidation of propylene to propylene oxide various side products especially those containing six carbon atoms such as hexane, hexene and their isomers are formed. Since these compounds exhibit boiling points very close to that of propylene oxide separation by fractional distillation is extremely difficult. With some compounds azeotropes are formed which make economical separations impossible. It has now been found that a highly efficient separation can be obtained by adding to the mixture an open chain or cyclic paraffin as a distillation agent. This agent changes the volatility of the other hydrocarbons relative to that of propylene oxide and thus makes an effective separation possible. The use of a paraffin distillation agent is operable over a wide range of propylene oxide/hydrocarbon cencentrations including mixtures in which either the propylene oxide or the hydrocarbon is the major component.

It is an object of this invention to provide a method for fractional distillation of propylene oxide to effect a separation from other hydrocarbons exhibiting boiling points equal to or near propylene oxide.

The invention is practiced by fractionally distilling a propylene oxide mixture in the presence of an open chain or cyclic paraffin in an amount sufficient to effect a separation of propylene oxide from other hydrocarbons exhibiting boiling points equal to or near propylene oxide. The paraffin can be any saturated open chain or cyclic hydrocarbon containing from 8 to 12 carbon atoms. These paraffins do not azeotrope with either the propylene oxide or the hydrocarbons. Preferably, the paraffin contains from 8 to 10 carbon atoms. For example, octane, isooctane, nonane, decane, undecane, dodecane, ethyl cyclohexane, propyl cyclopentane, propyl cyclohexane, diethyl cyclohexane, hexyl cyclohexane and dimethyl cyclohexane can be used.

Optimum separations are obtained when the paraffin is present in an amount sufficient to lower the relative volatilities of the hydrocarbons below 0.80. In most cases, paraffin concentrations ranging from 0.1 to 20 parts by weight per one part by weight propylene oxide in the feed are sufficient. Preferably, the paraffin concentration ranges from 1 to 15 parts by weight per part propylene oxide in the feed.

The fractional distillation is carried out under normal conditions. Preferably, the feed is introduced at point near the bottom of the column and the paraffin introduced at a point near the top of the column. Pressures greater than atmospheric are suitable. The purified propylene oxide is recovered overhead and a portion is recycled to the column to provide a reflux which prevents the paraffin agent from distilling overhead. The bottoms comprise the paraffin and the hydrocarbon impurities such as hexane, hexene, 2-methyl pentane, 4-methyl pentene-1, 4-methyl pentene-2, 2-methyl pentene-1 and 2-methyl pentene-2. The bottoms can be subjected to an additional separation of paraffin from hydrocarbon impurities. The paraffin can be then recycled to the column.

The following examples are given to illustrate specific embodiments of this invention and should not be construed as limitations upon the scope of the invention.

Example I

A propylene oxide feed was prepared having the following composition in percent by weight:

|   | Percent |
|---|---|
| Propylene oxide | 99.80 |
| 2-methyl pentane | 0.05 |
| 4-methyl pentene-1 | 0.05 |
| 2-methyl pentene-1 | 0.05 |
| 2-methyl pentene-2 | 0.05 |
|   | 100.00 |

In each run a portion of the feed was charged to a stirred vessel and heated to the temperature specified in Table I. The overhead line was heated to prevent refluxing and the overhead product was continually returned to the bottom of the vessel. The temperature was maintained for one hour at which time a sample of the overhead was taken and analyzed by gas chromatograph. In Runs 2–4 the procedure was repeated utilizing decane as a distillation agent. From an analysis of the overhead streams and the liquid remaining in the vessel, the following relative volatilities were determined.

TABLE I

| Run No. | Liquid temp., °F. | Weight percent decane | Relative volatility of hydrocarbon relative to propylene oxide | | | |
|---|---|---|---|---|---|---|
|   |   |   | 2-methyl pentane | 4-methyl pentene-1 | 2-methyl pentene-1 | 2-methyl pentene-2 |
| 1 | 95.5 | 0 | 1.20 | 1.13 | 0.86 | 0.78 |
| 2 | 96.3 | 10 | 0.96 | 0.96 | 0.70 | 0.66 |
| 3 | 101.0 | 34 | 0.80 | 0.90 | 0.61 | 0.51 |
| 4 | 118.2 | 66 | 0.83 | 0.79 | 0.34 | 0.32 |

From the data in Table I the effect of the paraffin is clearly shown by the change in relative volatility of the various hydrocarbon impurities.

Example II

The following runs were conducted utilizing the feed and procedure of Example I.

TABLE II

| Run No. | Liquid temp., °F. | Weight percent decane | Relative volatility of hydrocarbon relative to propylene oxide | | |
|---|---|---|---|---|---|
| | | | 2-methyl pentane | 4-methyl pentene-1 | 2-methyl pentene-2 |
| 5 | 95.0 | 0 | 1.14 | 1.16 | .76 |
| 6 | 96.0 | 9.1 | .98 | .97 | .59 |
| 7 | 98.0 | 17.2 | .84 | .92 | .58 |
| 8 | 100.0 | 24 | .69 | .78 | .54 |
| 9 | 101.5 | 29.2 | .65 | .79 | .53 |
| 10 | 103 | 34.2 | .63 | .75 | .49 |
| 11 | 104 | 38.5 | .57 | .74 | .48 |

Example III

When the propylene oxide feed of Example I is mixed with other paraffins such as octane, nonane, dodecane, ethyl cyclohexane and butyl cyclohexane and distilled in accordance with the procedure of Example I, similar results are obtained.

Example IV

A propylene oxide feed contains 2-methyl pentane, 4-methyl pentene-1, 2-methyl pentene-1 and 2-methyl pentene-2 all in concentrations of less than 0.2 weight percent each. This feed is heated and charged near the bottom of a distillation column in which octane is entering at a point near the top of the column. The weight ratio of octane to propylene oxide feed is about 12. The distillation is conducted at an elevated pressure such that the temperature is in excess of 200° F. and propylene oxide (99+ purity) is drawn off as overhead. A reflux equal to 1.8 times the amount of feed is maintained. The bottoms which comprise octane and the hydrocarbons are removed and further separated. The paraffin stream after the hydrocarbon impurities have been removed therefrom is then recycled to the distillation column.

I claim:

1. In the fractional distillation of propylene oxide from hydrocarbons containing six carbon atoms and exhibiting boiling points equal to or near propylene oxide, the improvement which comprises distilling the mixture in the presence of an open chain or cyclic paraffin containing from 8 to 12 carbon atoms and which does not form an azeotrope with the propylene oxide or hydrocarbons, said paraffin being added in an amount sufficient to lower the volatility of the hydrocarbons relative to the propylene oxide to below 0.8 and effect a separation of propylene oxide from the hydrocarbons, the purified propylene oxide being recovered as overhead and the bottoms comprising said paraffin and hydrocarbons.

2. A method according to claim 1 wherein the amount of paraffin ranges from 1 to 15 parts per part propylene oxide in the feed.

3. A method according to claim 1 wherein the paraffin is an alicyclic compound.

4. A method according to claim 1 wherein the paraffin contains from 8 to 10 carbon atoms.

5. A method according to claim 1 wherein the paraffin is decane.

6. A method according to claim 5 wherein the paraffin is octane.

7. A method according to claim 1 wherein the hydrocarbons are selected from the group consisting of 2-methyl pentane, 4-methyl pentene-1, 2-methyl pentene-1, 2-methyl pentene-2 and mixtures thereof.

References Cited

UNITED STATES PATENTS

| 3,039,940 | 6/1962 | Prinz et al. | 203—68 X |
| 3,337,425 | 8/1967 | Binning et al. | 203—52 |
| 3,350,415 | 10/1967 | Binning | 260—348.5 |
| 3,350,416 | 10/1967 | Binning et al. | 260—348.5 |
| 3,350,420 | 10/1967 | Fariss | 203—52 X |
| 3,338,800 | 8/1967 | Binning et al. | 203—52 |
| 3,350,418 | 10/1967 | Bowe et al. | 203—52 X |
| 3,350,419 | 10/1967 | Null et al. | 260—348.5 |

NORMAN YUDKOFF, Primary Examiner

F. E. DRUMMOND, Assistant Examiner

U.S. Cl. X.R.

203—68, 70; 260—348.5

Notice of Adverse Decision in Interference

In Interference No. 97,594 involving Patent No. 3,464,897, J. C. Jubin, Jr., SEPARATION OF PROPYLENE OXIDE FROM OTHER HYDROCARBONS, final judgment adverse to the patentee was rendered Oct. 1, 1973, as to claims 1, 2, 3, 4, 6 and 7.

[*Official Gazette February 26, 1974.*]